US012798311B2

(12) United States Patent
Beierl

(10) Patent No.: US 12,798,311 B2
(45) **Date of Patent: *Nov. 17, 2026**

(54) REAR ARRANGEMENT FOR A VEHICLE

(71) Applicant: Dr. Ing. h.c. F. Porsche Aktiengesellschaft, Stuttgart (DE)

(72) Inventor: Dominik Beierl, Korntal-Münchingen (DE)

(73) Assignee: Dr. Ing. h.c. F. Porsche Aktiengesellschaft Germany (DE)

( * ) Notice: Subject to any disclaimer, the term of this patent is extended or adjusted under 35 U.S.C. 154(b) by 1109 days.

This patent is subject to a terminal disclaimer.

(21) Appl. No.: 17/737,126

(22) Filed: May 5, 2022

(65) Prior Publication Data

US 2022/0355633 A1 Nov. 10, 2022

(30) Foreign Application Priority Data

May 6, 2021 (DE) ..................... 10 2021 111 756.9

(51) Int. Cl.
*B60D 1/54* (2006.01)
*B60D 1/60* (2006.01)
*B62D 35/00* (2006.01)

(52) U.S. Cl.
CPC ................. *B60D 1/54* (2013.01); *B60D 1/60* (2013.01); *B62D 35/007* (2013.01)

(58) Field of Classification Search
CPC ... B60D 1/54; B60D 1/60; B60D 1/06; B62D 35/007; B62D 35/02; B62D 37/02
USPC .......................................................... 280/477
See application file for complete search history.

(56) References Cited

U.S. PATENT DOCUMENTS

| | | | |
|---|---|---|---|
| 614,981 | A | 11/1898 | Ream |
| 2,544,185 | A | 3/1951 | Sargent |
| 5,628,536 | A | 5/1997 | Fulkerson |
| 6,189,910 | B1 | 2/2001 | Bartel |

(Continued)

FOREIGN PATENT DOCUMENTS

| | | | |
|---|---|---|---|
| DE | 19654867 | A1 | 8/1997 |
| DE | 19944082 | A1 | 3/2001 |

(Continued)

OTHER PUBLICATIONS

Notice of Allowance issued by the U.S. Patent and Trademark Office in U.S. Appl. No. 17/737,124, mailed Aug. 7, 2025, U.S. Patent and Trademark Office, Alexandria, VA. (18 pages).

(Continued)

*Primary Examiner* — Valentin Neacsu
*Assistant Examiner* — Tyler Jay Stanley
(74) *Attorney, Agent, or Firm* — Buchanan Ingersoll & Rooney PC

(57) ABSTRACT

A rear arrangement for a vehicle includes a trailer coupling mount and a rear diffuser having an adjustable air-guiding element which is adjustable between a retracted position and an extended position. The trailer coupling mount is pivotable about a pivot axis, which is congruent or parallel to the vehicle longitudinal axis (x), between an inoperative position and a use position. The air-guiding element in the retracted position at least partially conceals the trailer coupling mount, and the air-guiding element has to be brought into the extended position so that the trailer coupling mount can be pivoted into the use position.

15 Claims, 2 Drawing Sheets

(56) References Cited

U.S. PATENT DOCUMENTS

| | | | | |
|---|---|---|---|---|
| 6,402,178 | B1 | 6/2002 | Ifflaender | |
| 6,874,806 | B1 | 4/2005 | Blake | |
| 7,338,064 | B1 | 3/2008 | Williams | |
| 9,283,999 | B2 | 3/2016 | Wolf et al. | |
| 9,327,780 | B1 | 5/2016 | Bird et al. | |
| 9,981,516 | B1 | 5/2018 | Alvarez | |
| 10,252,590 | B2 | 4/2019 | Jackson et al. | |
| 10,676,140 | B2 | 6/2020 | Wolf et al. | |
| 10,857,846 | B1 | 12/2020 | Jacobs | |
| 11,220,145 | B2 | 1/2022 | Rimmelspacher et al. | |
| 12,097,909 | B2 | 9/2024 | Beierl | |
| 2002/0047247 | A1 | 4/2002 | Moss | |
| 2005/0161904 | A1 | 7/2005 | McJunkin | |
| 2005/0167946 | A1 * | 8/2005 | Rampp | B60D 1/246<br>280/491.1 |
| 2008/0029996 | A1 | 2/2008 | Mater et al. | |
| 2011/0204594 | A1 | 8/2011 | Garth | |
| 2013/0147157 | A1 * | 6/2013 | Lee | B60D 1/54<br>280/491.1 |
| 2017/0136837 | A1 | 5/2017 | Merino et al. | |
| 2019/0009841 | A1 | 1/2019 | Wolf et al. | |
| 2021/0023897 | A1 | 1/2021 | McManus | |
| 2022/0194151 | A1 | 6/2022 | Hernandez | |
| 2022/0219500 | A1 * | 7/2022 | Shaeff | B60D 1/246 |
| 2022/0355631 | A1 | 11/2022 | Beierl | |
| 2022/0355632 | A1 | 11/2022 | Beierl | |

FOREIGN PATENT DOCUMENTS

| | | | | |
|---|---|---|---|---|
| DE | 10045296 | A1 | 4/2001 | |
| DE | 10004523 | A1 | 8/2001 | |
| DE | 102007002798 | B4 | 7/2011 | |
| DE | 102012014176 | A1 | 1/2014 | |
| DE | 102014116000 | A1 | 5/2016 | |
| DE | 102016111158 | A1 * | 12/2016 | B60D 1/06 |
| DE | 102016204846 | A1 | 9/2017 | |
| DE | 102013019503 | C5 | 10/2018 | |
| DE | 102017114863 | A1 | 1/2019 | |
| EP | 1400379 | A1 * | 3/2004 | B60D 1/54 |
| EP | 1782973 | A2 * | 5/2007 | B60D 1/26 |
| FR | 3072640 | A1 * | 4/2019 | B62D 35/007 |
| GB | 2578153 | A | 4/2020 | |
| KR | 2008021912 | A * | 3/2008 | B60D 1/54 |
| KR | 100821782 | B1 * | 4/2008 | B60D 1/56 |
| WO | 2019077101 | A1 | 4/2019 | |

OTHER PUBLICATIONS

Final Office Action issued by the U.S. Patent and Trademark Office in U.S. Appl. No. 17/735,485, mailed Jan. 27, 2026, U.S. Patent and Trademark Office, Alexandria, VA. (19 pages).

* cited by examiner

REAR ARRANGEMENT FOR A VEHICLE

CROSS-REFERENCE TO RELATED APPLICATION

This application claims priority to German Patent Application No. 10 2021 111 756.9, filed May 6, 2021, the content of such application being incorporated by reference herein in its entirety.

FIELD OF THE INVENTION

The invention relates to a rear arrangement for a vehicle.

BACKGROUND OF THE INVENTION

WO 2019/077101 A1, which is incorporated by reference herein, discloses a vehicle comprising an adjustable rear diffuser and a removable trailer coupling. How the rear diffuser and the trailer coupling should precisely be arranged relative to each other is not disclosed.

DE 10 2012 014 176 A1, which is incorporated by reference herein, discloses a trailer coupling device for a vehicle, comprising a trailer coupling which is shiftable between a retracted and an extended position and which, in the extended position, protrudes through an opening which is provided on the rear part and is closable by means of a cover element. Said cover element is arranged in a further, larger cover element which, for the shifting of the trailer coupling into the extended position, has to be removed and reinserted. The cover elements have to be handled manually.

SUMMARY OF THE INVENTION

The rear arrangement for a vehicle has a trailer coupling mounting means and a rear diffuser having an adjustable air-guiding element. The air-guiding element is adjustable between a retracted position and an extended position. The trailer coupling mounting means is pivotable about a pivot axis, which is oriented congruently or parallel to the vehicle longitudinal axis, between an inoperative position and a use position. In the retracted position, the air-guiding element at least partially conceals the trailer coupling mounting means, and the air-guiding element has to be brought into the extended position or has to be located in the extended position so that the trailer coupling mounting means can be pivoted into the use position.

When not in use (inoperative position), the trailer coupling mounting means is therefore located outside the region of view, namely behind the adjustable air-guiding element or behind the adjustable air-guiding element and a rear covering element adjacent thereto. Only during use is the trailer coupling mounting means correspondingly pivoted or tilted forward (use position) and is only then visible. When not in use, the trailer coupling mounting means is protected from environmental influences, for example soiling. In addition, the trailer coupling mounting means is then concealed, and therefore, when not in use, it does not form a visual or aerodynamic interfering element.

The vehicle is in particular a motor vehicle, such as a passenger vehicle, e.g. a sports car or an SUV.

As previously explained, the adjustable air-guiding element can be brought into a retracted position and an extended position. The adjustable air-guiding element can be adjusted in particular depending on the driving situation or selected driving program.

In the retracted position, the air-guiding element is located "at the top" along the direction of gravity (vehicle vertical axis or Z axis). The adjustable air-guiding element can be adjacent here to an adjacent rear covering element in such a manner that the contour thereof is continued. The retracted position is in particular a position in which a comparatively high aerodynamic down force is generated at the vehicle rear ("performance position").

In the retracted position, the air-guiding element is located "at the bottom" along the direction of gravity (vehicle vertical axis or Z axis). The adjustable air-guiding element can protrude or be pivoted here relative to an adjacent rear covering element. The extended position is in particular a position in which a comparatively low aerodynamic down force is generated at the vehicle rear ("ECO position").

As already indicated, the rear arrangement can have a rear covering which can be formed from one or more rear covering elements. The rear covering can be, for example, a bumper covering.

The adjustable air-guiding element can be designed as a flat element which extends along the vehicle longitudinal direction (x axis) and along the vehicle transverse direction (y axis). In addition, the adjustable air-guiding element can have a defined thickness.

The adjustable air-guiding element can be adjacent at one end (forward along the vehicle longitudinal direction, i.e. forward in the direction of travel) to a further air-guiding element which is optionally not adjustable. The further air-guiding element can form, for example, part of a vehicle underbody covering. At the other end (rearward along the vehicle longitudinal direction, i.e. rearward in the direction of travel), the adjustable air-guiding element can be adjacent to a rear covering element, as already explained.

The adjustable air-guiding element can be mounted pivotably about a pivot axis such that the air-guiding element can be pivoted between the retracted position and the extended position. The pivot axis can be located, for example, at that end of the adjustable air-guiding element which faces the further air-guiding element. The pivot axis of the air-guiding element can be oriented congruently or parallel to the vehicle transverse axis.

The inoperative position and the use position of the trailer coupling mounting means can be located apart from each other by an angle of 45° to 180°, preferably of 60° to 135°, furthermore preferably of 80° to 100°, even more preferably 90°.

The rear arrangement can preferably have a rear covering element which is adjacent to the adjustable air-guiding element, wherein the rear covering element at least partially, preferably completely, conceals the trailer coupling mounting means, in particular with regard to the rear arrangement along the vehicle longitudinal direction forward, i.e. forward in the direction of travel, whenever the adjustable air-guiding element is in the extended position and the trailer coupling mounting means is in the inoperative position. As a result, the trailer coupling mounting means is also at least mostly or completely outside the region of view whenever the adjustable air-guiding element is in the extended position. The rear covering element can have a license plate recess, wherein, in the inoperative position, the trailer coupling mounting means can be located behind the license plate recess.

The trailer coupling mounting means can preferably be coupled to a bodyshell element of the rear arrangement, for example to a bumper crossmember, and mounted pivotably about the pivot axis by means of a bearing unit, for example a bearing bracket. A structurally simple and stable coupling of the trailer coupling mounting means to the rear arrangement or to the vehicle is thus provided.

An actuator for the trailer coupling mounting means can preferably be provided, by means of which the trailer coupling mounting means can be pivoted. An automatic pivoting of the trailer coupling mounting means between an inoperative position and the use position is therefore possible. This increases the operating comfort for a user and permits a compact arrangement of the components of the rear arrangement since the user does not have to be able to reach the trailer coupling mounting means in the inoperative position (by hand).

The trailer coupling mounting means can preferably have a receptacle for a removable plug-in coupling. The trailer coupling mounting means thereby takes up comparatively little space in the rear arrangement since the plug-in coupling does not have to be concealed in the inoperative position, but rather is then only inserted into the receptacle when this is actually required. The receptacle can be, for example, a square receptacle, i.e. a receptacle which is configured and intended for receiving a square (on the plug-in coupling). The receptacle is spaced apart from the pivot axis (pivoting arm portion) by a certain distance. The plug-in coupling can in particular have a push-in piece (fits into the receptacle) and a coupling element, for example a coupling ball, wherein the push-in piece and the coupling element are connected to each other via an intermediate piece.

The rear arrangement can preferably have a socket and/or at least one securing chain eyelet that are each coupled to the trailer coupling mounting means or to a bodyshell element of the rear arrangement, for example a bumper crossmember. Said components can therefore be pivotable together with the trailer coupling mounting means or they are stationary, for example are coupled to the bumper crossmember.

The rear arrangement can preferably have a (further) actuator for the adjustable air-guiding element, by means of which the adjustable air-guiding element is adjustable or can be adjusted between the retracted position and the extended position. The adjustable air-guiding element can therefore be automatically adjusted between the retracted position and the extended position by means of the actuator. This increases the operating comfort and extends use possibilities. The actuator can be coupled, for example, to a bodyshell element of the rear arrangement, for example a bumper crossmember. A fastening element can be fastened to the adjustable air-guiding element, said fastening element being coupled pivotably to a coupling arm which, in turn, is coupled to the actuator.

An operating element can preferably be provided or arranged on the rear arrangement or in the vehicle (for example in the trunk), wherein the operating element is coupled electrically and/or electronically to a control means (e.g., processor, computer, computer processor, controller, etc.) which is configured to activate the actuator for the trailer coupling mounting means and/or the actuator for the adjustable air-guiding element. Thus, by activation of one or both actuators, the trailer coupling mounting means and/or the air-guiding element can be actuated. This contributes to a high level of operating comfort.

The control means can have a calculating means, a first interface for receiving input variables (for example an operating element switching position) and a second interface for outputting output variables (for example activation signals for the two actuators).

The control means can preferably be configured to activate the actuator for the adjustable air-guiding element as a result of an actuation of the operating element so that the air-guiding element is adjusted into the extended position, and to (then) activate the actuator for the trailing coupling mounting means so that the trailer coupling mounting means is pivoted into the use position, wherein, when the trailer coupling mounting means is pivoted into the use position, a retraction or adjustment of the air-guiding element into the retracted position is locked. The plug-in coupling can then be mounted in this state. This contributes to a simple and comfortable use of the rear arrangement for an operator. Misoperations or damage arising therefrom can therefore be largely avoided.

BRIEF DESCRIPTION OF THE DRAWINGS

Further advantageous refinements emerge from the description below and the drawing. In the drawing, in each case schematically.

DETAILED DESCRIPTION OF THE INVENTION

Figure 1A:
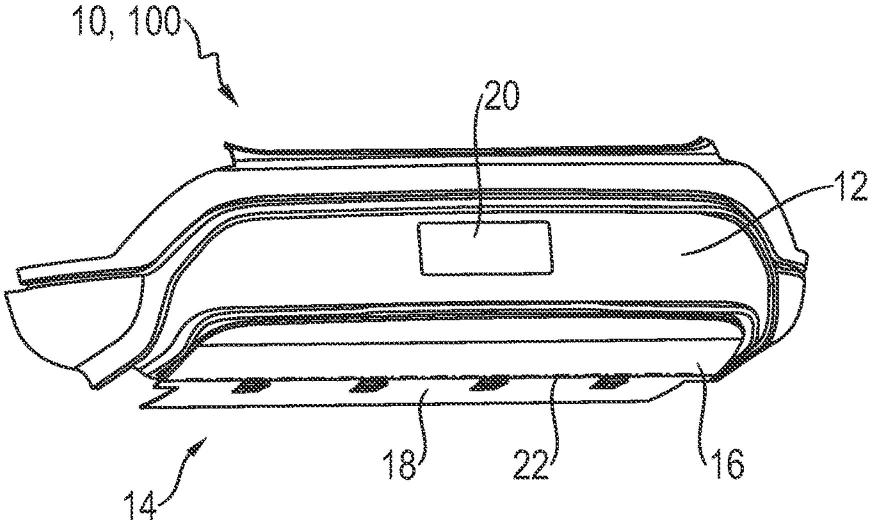
FIGS. 1*a*-1*c* show a perspective view of a rear arrangement of a vehicle, with the air-guiding element in a retracted position and the trailer coupling mounting means in the inoperative position (FIG. 1*a*), the air-guiding element in the extended position and the trailer coupling mounting means in the inoperative position (FIG. 1*b*), and the air-guiding element in the extended position and the trailer coupling mounting means in the use position (FIG. 1*c*)
Figure 1B:
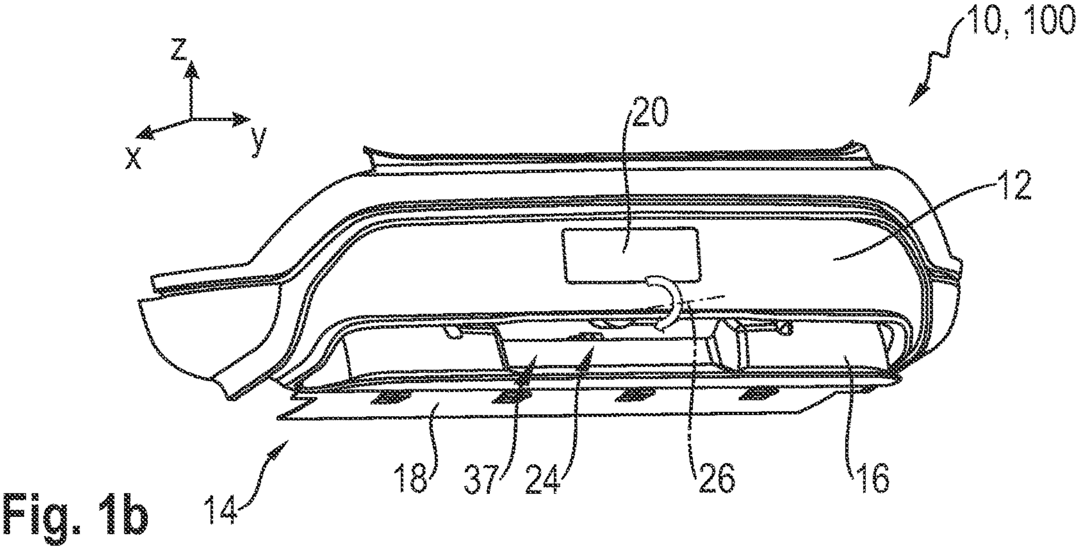
Figure 1C:
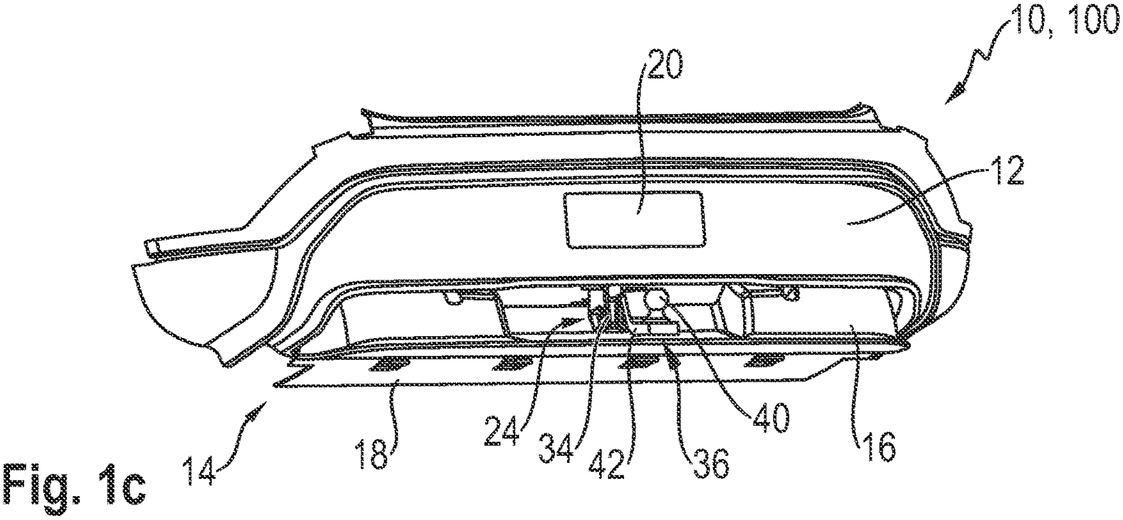

FIGS. 1*a*-1*c* schematically show a rear arrangement 10 for a vehicle 100. The rear arrangement 10 is explained with respect to a vehicle longitudinal direction (x axis), a vehicle transverse direction (y axis) and a vehicle vertical axis (z axis).

The rear arrangement 10 has a rear covering element 12 which forms part of a bumper covering of the vehicle 100. In addition, the rear arrangement 10 has a rear diffuser 14 having an adjustable air-guiding element 16. A further adjustable air-guiding element 18 which, in the example, is designed as a non-adjustable air-guiding element 18 and, for example, can form part of an underbody covering is adjacent to the adjustable air-guiding element 16. In the example, a license plate recess 20 is formed on the rear covering element 12.

Figure 2A:
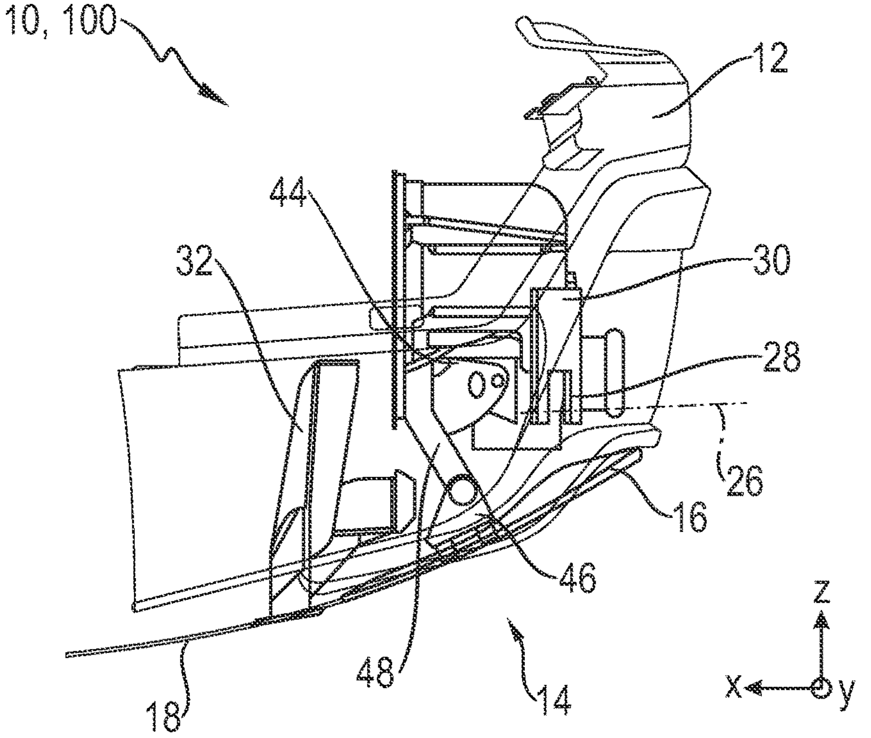
FIGS. 2*a*-2*b* show a partially sectioned side view of the rear arrangement from FIG. 1*a* with the air-guiding element in a retracted position and the trailer coupling mounting means in the inoperative position (FIG. 2*a*), and the air-guiding element in the extended position and the trailer coupling mounting means in the use position (FIG. 2*b*).
Figure 2B:
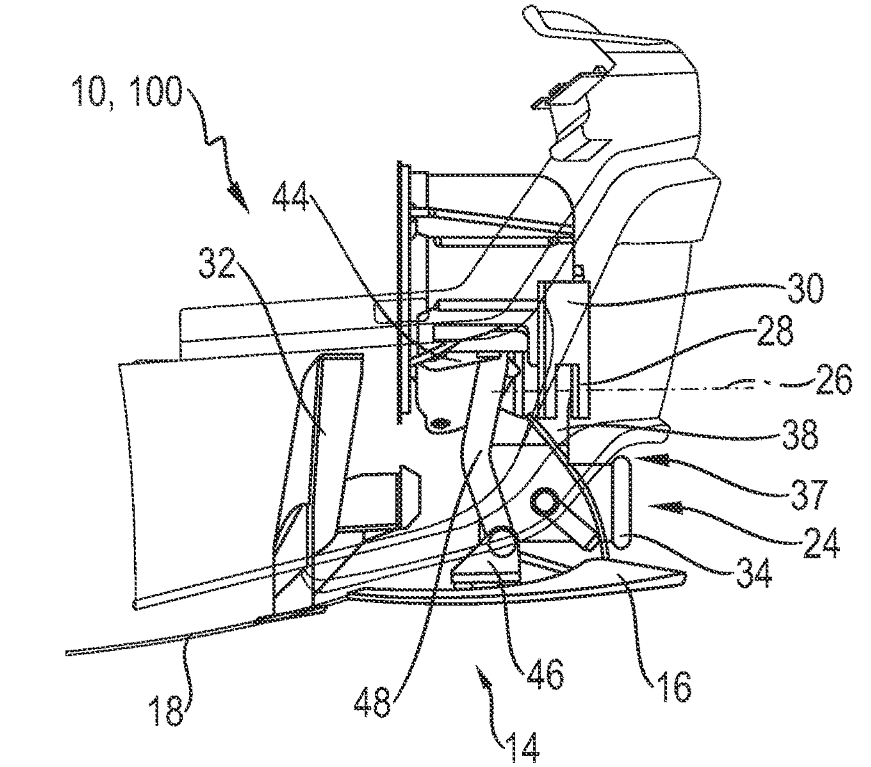

The air-guiding element 16 is adjustable between a retracted position (cf. FIGS. 1*a* and 2*a*) and an extended position (cf. FIGS. 1*b*, 1*c* and 2*b*). In the example, the air-guiding element 16 is pivotable and for adjustment, is pivoted about a pivot axis 22 which is located at that end of the air-guiding element 16 which faces the further air-guiding element 18.

The rear arrangement 10 also has a trailer coupling mounting means 24. The trailer coupling mounting means 24 is pivotable between an inoperative position (cf. FIGS. 1*a*, 1*b* and 2*a*) and a use position (cf. FIGS. 1*c* and 2*b*) about a pivot axis 26 which is oriented parallel to the vehicle longitudinal axis (x axis). In the example, the trailer coupling mounting means 24 is pivoted here about an angle of approx. 90° into the use position (clockwise, cf. arrow in FIG. 1B).

In the example, the air-guiding element 16, in the retracted position (cf. FIGS. 1*a* and 2*a*), conceals the trailer coupling mounting means 24 together with the rear covering element 12, and the air-guiding element 16 has to be brought into the extended position or has to be located in this position so that the trailer coupling mounting means 24 can be pivoted into the use position (cf. FIGS. 1*c* and 2*b*).

The rear covering element 12 conceals the trailer coupling mounting means 24, in particular forward along the vehicle longitudinal direction (x axis) when looking at the rear arrangement 10, whenever the adjustable air-guiding element 16 is in the extended position and the trailer coupling mounting means 24 is in the inoperative position (cf. FIG. 1B). As a result, the trailer coupling mounting means 24 is also outside the region of view whenever the adjustable air-guiding element 16 is in the extended position (cf. FIG. 1B). In the inoperative position, the trailer coupling mounting means 24 is located behind the license plate recess 20.

The trailer coupling mounting means 24 is coupled to a bodyshell element 30 of the rear arrangement 10, for example a bumper crossmember 30, and mounted pivotably about the pivot axis 26 (cf. FIGS. 2*a* and 2*b*) by means of a bearing unit 28, for example a bearing bracket. A further bumper crossmember 32 can be provided for stabilizing the rear arrangement 10.

An actuator (not shown) is provided for the trailer coupling mounting means 24, by means of which actuator the trailer coupling mounting means 24 can be pivoted (automatic pivoting).

The trailer coupling mounting means 24 has a receptacle 34 for a removable plug-in coupling 36 (cf. FIGS. 1*c* and 2*b*). In the use position of the trailer coupling mounting means 24, the receptacle 34 is in the intermediate space 37 between the rear covering element 12 and the air-guiding element 16. In the example, the receptacle 34 is designed as a square receptacle. The receptacle 34 is spaced apart from the pivot axis 26 (pivoting arm portion 38) by a certain distance. The plug-in coupling 36 has a push-in piece (fitting into the receptacle 34 and being visually concealed by the latter) and a coupling element 40, for example a coupling ball 40. The push-in piece and the coupling element 40 are connected to each other via an intermediate piece 42.

In addition, a socket and/or at least one securing chain eyelet can be provided on the rear arrangement 10, as explained above (not shown).

The rear arrangement 10 has a further actuator 44 for the adjustable air-guiding element 16, by means of which the adjustable air-guiding element 16 can be adjusted between the retracted position and the extended position. In the example, the actuator 44 is coupled to the bumper crossmember 30. A fastening element 46 is fastened to the air-guiding element 16, said fastening element being coupled pivotably to a coupling arm 48 which, in turn, is coupled to the actuator 44.

An operating element can be provided or arranged on the rear arrangement 10 or in the vehicle 100 (for example in the trunk), wherein the operating element is coupled electrically and/or electronically to a control means (not shown) which is configured to activate the actuator for the trailer coupling mounting means 24 and/or the actuator 44 for the adjustable air-guiding element 16. Therefore, by activation of the actuators 44, the trailer coupling mounting means 24 and the air-guiding element 16 can be actuated. As explained above, the control means can have a computing means, a first interface for receiving input variables and a second interface for outputting output variables.

The control means can preferably be configured to carry out the steps described below as a result of an actuation of the operating element. First of all, the control means activates the actuator 44 for the adjustable air-guiding element 16 so that the air-guiding element 16 is adjusted or pivoted from the retracted position into the extended position (cf. FIG. 1B). The control means then activates the actuator for the trailer coupling mounting means 24 so that the trailer coupling mounting means 24 is pivoted into the use position (cf. FIGS. 1*c*, 2*b*). When the trailer coupling mounting means 24 is pivoted into the use position, retraction or adjustment of the air-guiding element 16 into the retracted position is blocked by the control means. In this state, the plug-in coupling 36 can then be fitted (cf. FIG. 1*c*).

What is claimed is:

1. A rear arrangement for a vehicle, said rear arrangement comprising:

- a trailer coupling mount that is pivotable about a pivot axis between an inoperative position and a use position, the pivot axis being congruent or parallel to a vehicle longitudinal axis (x);
- a rear diffuser having an adjustable air-guiding element which is adjustable between a retracted position and an extended position;
- an actuator for adjusting the adjustable air-guiding element between the retracted position and the extended position;
- a trailer coupling mount actuator for pivoting the trailer coupling mount; and
- an operating element that is coupled electrically and/or electronically to a control means which is configured to activate the trailer coupling mount actuator and the actuator for the adjustable air-guiding element,
- wherein, in the retracted position of the air-guiding element, the air-guiding element at least partially conceals the trailer coupling mount, such that the air-guiding element has to be brought into the extended position so that the trailer coupling mount can be pivoted into the use position,
- wherein the control means is configured to activate the actuator for the adjustable air- guiding element as a result of an actuation of the operating element so that the air-guiding element is adjusted into the extended position, and to activate the trailer coupling mount actuator so that the trailer coupling mount is pivoted into the use position, wherein, when the trailer coupling mount is in the use position, an adjustment of the air-guiding element into the retracted position is blocked,
- wherein the trailer coupling mount pivots about a single pivot axis by an angle of 45 to 180 degrees from a first rotational position corresponding to the inoperative position to a second rotational position corresponding to the use position, wherein the first rotational position and the second rotational position are circumferentially spaced apart about the single pivot axis by the angle of 45 to 180 degrees,
- wherein the trailer coupling mount includes a receptacle, and the rear arrangement further comprises a removable plug-in coupling removably mounted to the receptacle, wherein the removable plug-in coupling comprises a coupling ball, and
- wherein, in both the first rotational position and the second rotational position of the trailer coupling mount, the receptacle is oriented along the vehicle longitudinal axis (x) and faces rearwardly in relation to a forward direction of travel of the vehicle.

2. The rear arrangement as claimed in claim 1, wherein the rear arrangement has a rear covering element adjacent to the adjustable air-guiding element, wherein the rear covering element at least partially conceals the trailer coupling mount when the air-guiding element is in the extended position and the trailer coupling mount is in the inoperative position.

3. The rear arrangement as claimed in claim 1, wherein the trailer coupling mount is coupled to a bodyshell element of the rear arrangement and is pivotably mounted about the pivot axis by a bearing unit.

4. The rear arrangement as claimed in claim 1, wherein the rear arrangement has a socket and/or at least one securing chain eyelet that is/are coupled to the trailer coupling mount or to a bodyshell element of the rear arrangement.

5. A vehicle having the rear arrangement as claimed in claim 1.

6. The rear arrangement as claimed in claim 1, wherein the inoperative and use positions of the trailer coupling mount are separated by 180 degrees.

7. The rear arrangement as claimed in claim 1, wherein in the use position, the receptacle is positioned to receive the removable plug-in coupling.

8. The rear arrangement as claimed in claim 1, wherein the rear diffuser further comprises a fixed portion that is fixed to a rear bumper of the rear arrangement and extends to an elevation beneath the adjustable air guiding element, wherein a pivot axis of the adjustable air guiding element is defined at an intersection of the fixed portion and the adjustable air guiding element, and wherein the fixed portion is connected to the adjustable air-guiding element such that the fixed portion remains stationary as the adjustable air-guiding element moves between the retracted and extended positions.

9. The rear arrangement as claimed in claim 8, wherein in the retracted position of the adjustable air guiding element, a curved air flow surface is defined on exterior facing surfaces of the fixed surface and the adjustable air guiding element.

10. The rear arrangement as claimed in claim 8, wherein the rear bumper has a cutout extending across the bumper for receiving the adjustable air guiding element in the retracted position of the adjustable air guiding element, and wherein the adjustable air guiding element has a complementary shape so as to fit within the cutout in the rear bumper.

11. The rear arrangement as claimed in claim 8, wherein the fixed portion extends to an elevation beneath the adjustable air guiding element in both the retracted and extended positions of the adjustable air guiding element.

12. The rear arrangement as claimed in claim 8, wherein the fixed portion extends forward of the adjustable air guiding element as viewed in the vehicle longitudinal axis.

13. The rear arrangement as claimed in claim 8, wherein the fixed portion and the adjustable air guiding element extend parallel to each other along a vehicle transverse axis.

14. The rear arrangement as claimed in claim 1, wherein the first rotational position and the second rotational position are circumferentially spaced apart about the pivot axis by an angle of 90 degrees.

15. The rear arrangement as claimed in claim 1, wherein the first rotational position and the second rotational position are circumferentially spaced apart about the pivot axis by an angle of 180 degrees.

* * * * *